US005319215A

United States Patent [19]

Stibaner et al.

[11] Patent Number: 5,319,215

[45] Date of Patent: Jun. 7, 1994

[54] OFFSET SHEET-STACKING METHOD AND APPARATUS FOR FACILITATING PRINT QUALITY MEASUREMENTS OF PRINTED SHEETS

[75] Inventors: Manfred Stibaner, Dreicheich; Arno Wuhrl, Muhlheim/Main, both of Fed. Rep. of Germany

[73] Assignee: MAN Roland Druckmaschinen AG, Fed. Rep. of Germany

[21] Appl. No.: 27,683

[22] Filed: Mar. 8, 1993

[30] Foreign Application Priority Data

Mar. 6, 1992 [DE] Fed. Rep. of Germany ....... 4207107

[51] Int. Cl.[5] .......................................... G01N 21/86

[52] U.S. Cl. .......................... 250/559; 101/DIG. 45; 101/2; 101/482

[58] Field of Search .............................. 250/557, 559; 101/DIG. 45, 484, 485, 2, 482; 356/402, 425; 270/95

[56] References Cited

U.S. PATENT DOCUMENTS 4,852,485 8/1989 Brunner ...................... 101/DIG. 45
5,030,838 7/1991 Inde et al. .......................... 250/559

*Primary Examiner*—David C. Nelms
*Assistant Examiner*—K. Shami
*Attorney, Agent, or Firm*—Leydig, Voit & Mayer

[57] ABSTRACT

A device for stacking selected sheets in an offset manner so as to facilitate print quality measurements. Certain sheets are automatically or manually selected to be offset deposited onto a stack of sheets so that an edge of the selected sheet including a number of printed measuring fields extends beyond other sheets in the stack. A measuring head transversely scans the measuring fields of the selected sheet for print quality measurements while subsequent sheets are stacked in the ordinary manner. Since subsequent sheets do not cover the extending edge of the selected sheet, sufficient time is provided to complete the scanning operation with a single measuring head without interrupting or slowing the normal stacking rate.

19 Claims, 2 Drawing Sheets

OFFSET SHEET-STACKING METHOD AND APPARATUS FOR FACILITATING PRINT QUALITY MEASUREMENTS OF PRINTED SHEETS

FIELD OF THE INVENTION

The invention relates generally to printing machines, and more particularly to a sheet-stacking method and apparatus for facilitating print quality measurements of printed sheets.

BACKGROUND OF THE INVENTION

In sheet-fed offset printing, a printed control strip comprising information for measuring the quality of the printed sheets is often added to the printed sheets along the front sheet edge. These control strips comprise measuring fields which are sensed photoelectrically (for example, densitometrically or colorimetrically), and converted to corresponding measurement data values. The obtained data values are subsequently compared against predetermined ideal values, thus providing control data for making printing corrections such as color control adjustments. Additionally, the print control strip can be utilized for obtaining processing information, such as the rate of press operation.

The photoelectric sensing measurements of these measuring fields are sometimes obtained with a manually guided measuring head, for example, a hand-operated densitometer. However, when a substantial number of measuring fields are present in the print control strip, motorized systems have been developed to transversely drive the measuring heads (i.e., densitometers and/or colorimeters) over the print control strip in order to more rapidly obtain the measurements. Such devices are described in U.S. Pat. Nos. 4,200,932 and 4,671,661, (corresponding to German Patent No. 2,728,738 and European Patent No. 0,149,424 A2, respectively), and in European Patent No. 0,228,347 B1.

However, these aforementioned devices require an attendant to first extract sample sheets containing the control strip out of a stack of printed sheets delivered by the printing machine. The attendant must carefully align the sheet upon a support surface (i.e., control desk) beneath the corresponding measuring device, and then activate the motorized measuring device. Thus, the measuring operation consumes a substantial amount of the attendant's time, preventing performance of other duties, including supervising and other monitoring functions.

U.S. Pat. No. 5 029,525 (corresponding to German Patent No. DE 3,612,067 A1) is directed to a system wherein specimen-sheets are automatically extracted and conveyed directly to an adjacent control desk for measurement with a traversing densitometer. However, with this system the control desk for performing the measurements must be located adjacent the printing machine, in the direction of sheet conveyance. Accordingly, accessibility to the delivery stack is significantly reduced because of the location of the control desk, and thus to remove the stack of sheets requires either that the sheets be removed laterally or else that the control desk be temporarily displaced. Additionally, the control desk increases the overall length of the printing machine. Finally, a device for removing the measured sheets must be provided so that these specimen sheets do not accumulate after the measurement procedure.

Alternatively, to rapidly obtain the measured values of a print control strip without the need for an attendant, photoelectric sensing devices are disposed directly in the printing machine. For example, U.S. Pat. No. 5,095,818 (corresponding to German Patent No. DE 3,034,212 C2), DD Patent Specification 158,758 and DE 3,930,782 C1 describe printing machines having this "in-line" sensing feature. However, since at higher printing speeds the measurements must be obtained extremely rapidly, these machines require a multiplicity of photoelectric sensing devices in order to scan the large number of measuring fields distributed over the format width of the sheet. Accordingly, such systems are relatively expensive and, for reasons of space, require complex scanning arrangements.

Meanwhile, U.S. Pat. No. 4,730,822 is directed to a device for stacking certain sheets on a delivery table of a printing machine in a manner offset from the other sheets in the stack. In other words, certain sheets are placed onto the stack so that an edge of the sheet sticks out from the rest of the stack. However, this device is not used for obtaining print quality measurements, but only to designate certain portions of stacks by means of the overhanging sheets, i.e., like a bookmark.

OBJECTS AND SUMMARY OF THE INVENTION

Accordingly, it is an object of the present invention to provide a method and apparatus for automatically obtaining print control data from printed sheets without having to remove sheets from the stack.

Another object is to provide a simple method and apparatus as characterized above, where the apparatus efficiently obtains print control data without the necessity for employing a multiplicity of photoelectric sensing devices.

Still another object is to provide an offset sheet stacking apparatus of the above kind for facilitating the quality measurement of printed sheets that can be incorporated into conventional stacking mechanisms without requiring significant modifications or alterations to existing printing machines.

A further object is to provide such a method and apparatus which can be used to obtain quality measurements of printed images without the need for a control measurement table.

Other objects and advantages will become apparent from the following detailed description when taken in conjunction with drawings, in which:

Figure 1:
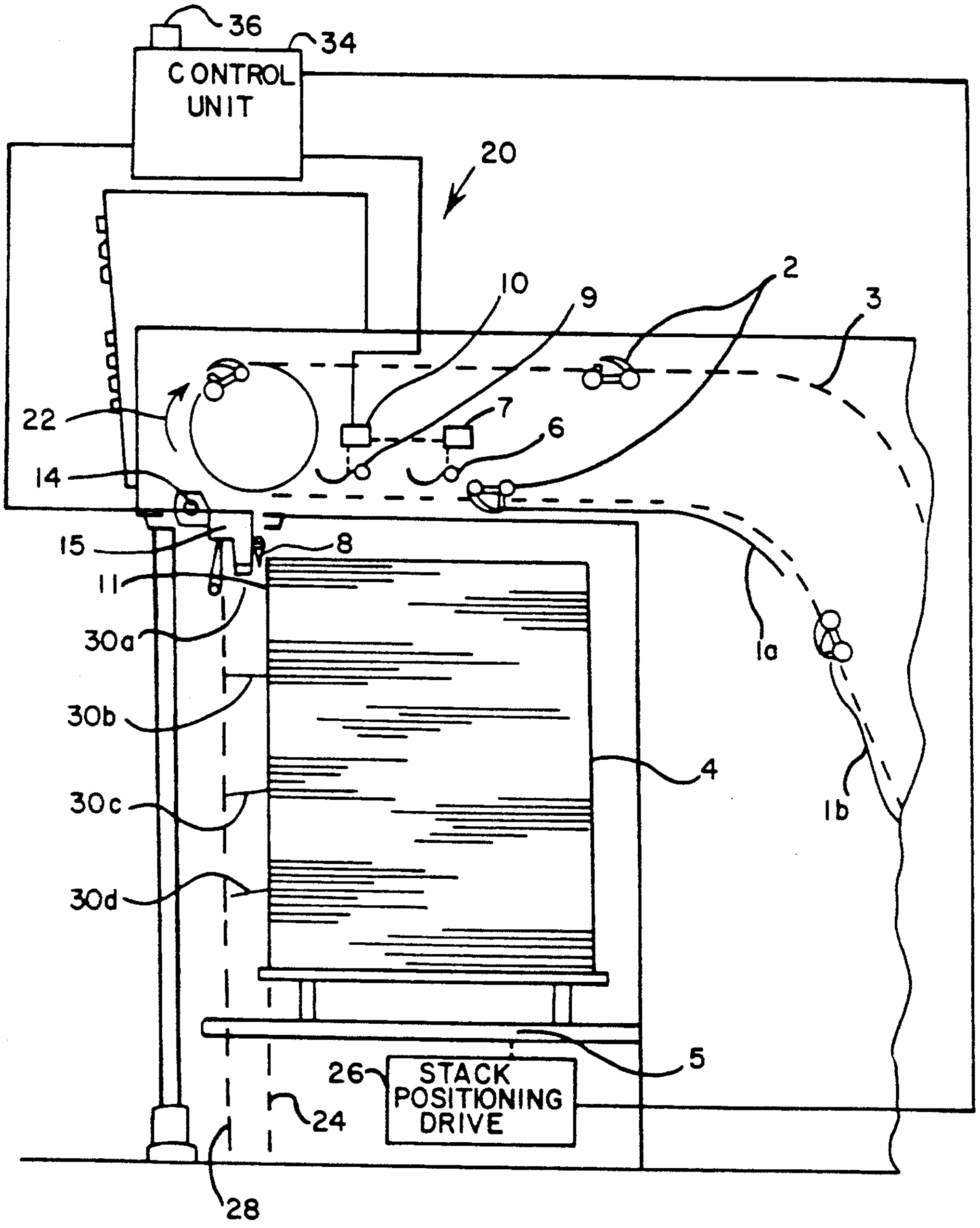
FIG. 1 is a side view of a printing press sheet transfer system having a sheet-stacking and print measuring device according to the present invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

Figure 3:
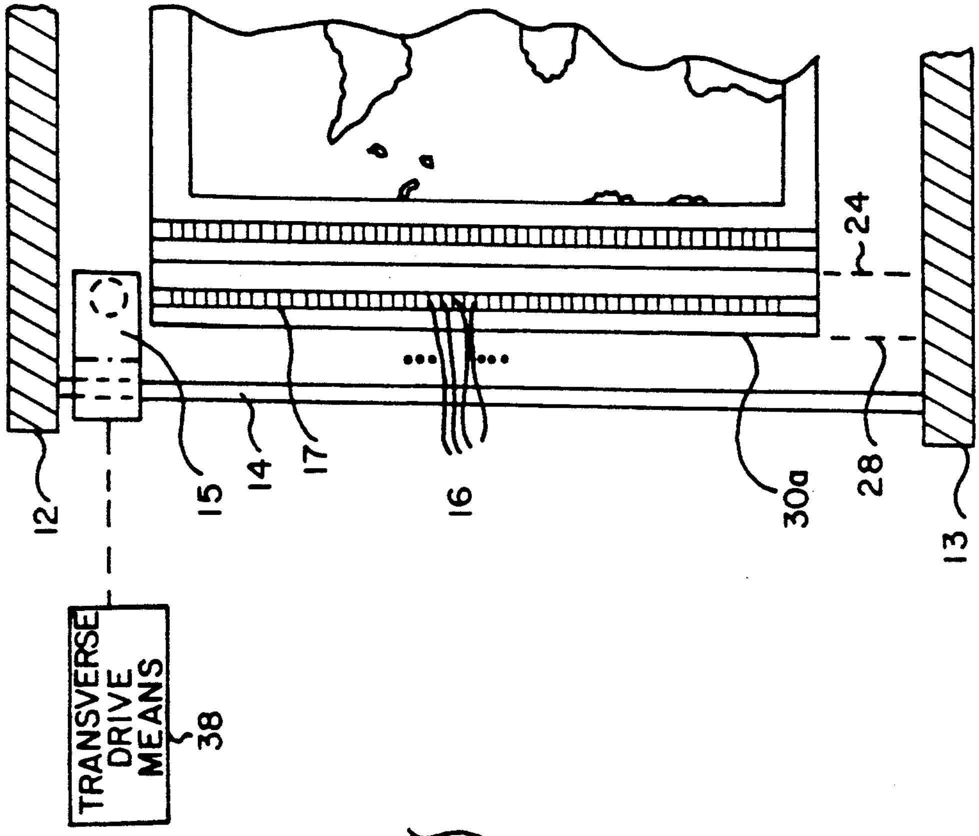
FIG. 3 shows a top-view of a traversing measuring head disposed to scan an offset sheet according to the present invention.

Turning to FIG. 1 of the drawings, there is shown an illustrative sheet transfer system, such as in a sheet-fed offset printing machine, having a stacking and measuring device 20 by which printed sheets 1*a* are deposited to form a stack of sheets 4. The sheet transfer system includes sheet gripper means 2, which may be conventional sheet grippers at regularly spaced intervals on a delivery chain 3 for carrying printed sheets 1*a* toward the stack of sheets 4 in the direction represented depicted by directional arrow 22, i.e, clockwise in FIG. 1. As shown in FIG. 3, to evaluate the print quality of sheets in the stack, it is preferable to print a control strip 17, comprised of measuring fields 16, on the front edge of the sheets.

As a sheet (for example sheet 1*a*) approaches the stack 4, a first gripper-opening cam 6 opens the corresponding gripper 2 and releases the sheet 1*a* so that the sheet 1*a* falls onto the stack 4. Since the sheets are moving in the direction indicated by arrow 22, the momentum of each sheet causes it to align against a first stop 8. Thus, sheets accumulate into a stack 4 with the sheet edges ordinarily aligning along imaginary line 24.

In order that released sheets will fall predictably and at a height range corresponding to the vertical position of the first stop 8, the stack 4 forms on a vertically adjustable stacking table 5. To adjust the height of the stacking table 5, a stack-positioning drive means 26 is employed to Vertically adjust (lower) the stacking table 5 as the stack 4 increases as sheets are added.

In accordance with the invention, certain sheets 30*a*–30*d* are deposited in an offset manner such that their forward edges bearing the control strip 17 extend beyond the edge of the rest of the stack, i.e., to imaginary line 28 instead of imaginary line 24, for enabling the print quality measurement of the control strip 17. To this end, a first actuating means 7, in cooperation with a second actuating means 10, disables the first gripper-opening cam 6 so that sheets will not be released at the ordinary release point as described above. Instead, gripper-opening cam 6 is pivoted away so that it will not open the gripper means 2, while a second gripper-opening cam 9, controlled by the second actuating means 10, is pivoted into a position to open the appropriate gripper means 2. The second gripper-opening cam 9 is disposed after the first the gripper-opening cam 6 in the direction of sheet conveyance 22 to release the sheet, for example sheet 1*b*. Accordingly, the sheet 1*b* is released at a later time which corresponds to a predetermined (i.e., further) conveying distance.

Figure 2:
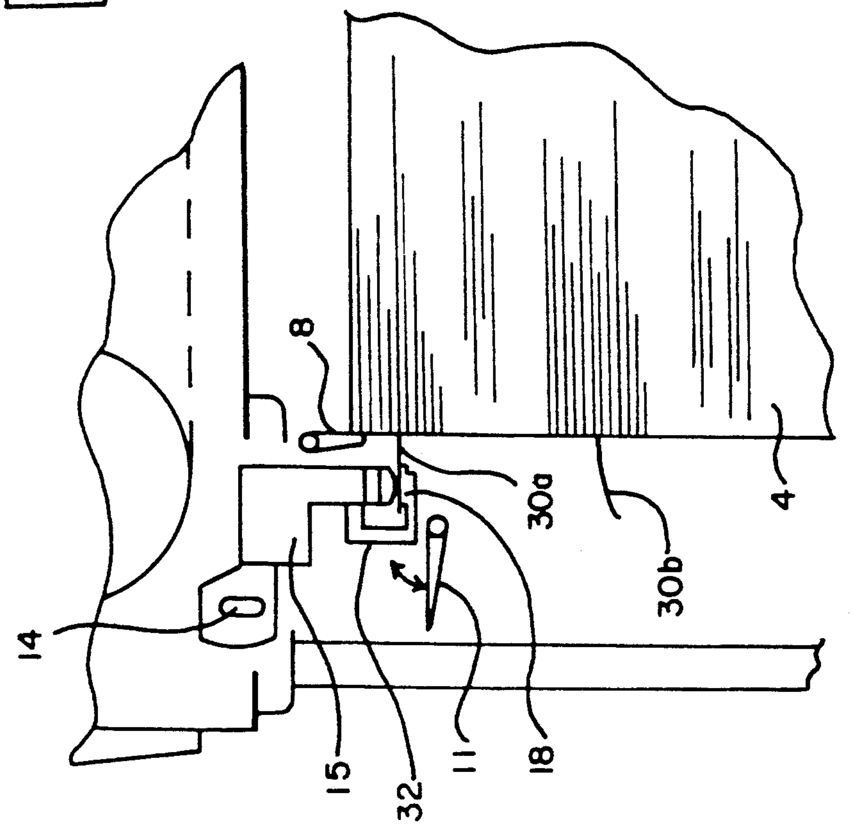
FIG. 2 is an enlarged view of the stacking and measuring device shown in FIG. 1.

In keeping with the invention, as shown in FIGS. 1 and 2 the first stop 8 is pivotable about an upper axis by appropriate means. Additionally, a second stop 11 is provided and is preferably pivotable about a lower axis by appropriate means. Accordingly, at the same time that the first gripper-opening means 6 is pivoted away and the second gripper-opening means 9 is enabled, the first stop 8 is pivoted away and the second stop 11 is pivoted upward into a second alignment position corresponding with imaginary line 28. The stops 8 and 11 can either be arranged as pivotable stop bars extending continuously along a substantial width of the sheets, or alternatively as one or more fingers spaced along rotatable shafts.

Although the aforementioned dual-pivoting stops are preferable, it can readily be appreciated that the second stop 11 can be fixed, since the first stop 8 is either present at the first stop location (along line 24) or is not present. Thus, once the first stop 8 is pivoted away, the sheets will align against the second stop 11 regardless of whether it is fixed or pivoted into position. Similarly, it will be understood by one skilled in the art that a moveable single-stop mechanism could be provided for aligning sheets into a first or second alignment position, (corresponding to the aforementioned dual-stop positions), merely by moving the single-stop mechanism back-and-forth between the two positions. Finally, it will also be appreciated that an appropriate sheet braking mechanism could accomplish the same offsetting of certain sheets by controlling the timing and/or force of the brake application.

In any case, because sheet 1*b* is released at a later time by gripper-opening cam 9 and aligns along the second stop 11, sheet 1*b* aligns at a position that is slightly offset from the rest of the stack 4 in the sheet-conveying direction. As a result, each of these offset sheets 30*a*–30*d* are not completely covered by subsequent sheets aligned in the ordinary manner along line 24. This enables the forward edge of the sheet (for example sheet 30*a*) to be evaluated for print quality even as subsequent sheets are stacked atop the sheet 30*a* in the ordinary manner, i.e., along line 24. Accordingly, sufficient time is provided for scanning the edge of an offset sheet without interrupting or slowing the normal rate at which subsequent sheets are stacked.

Because of the offsetting procedure described hereinbefore, the control strip 17 of sheet 30*a* remains visible, even as ordinarily-aligned sheets (along line 24) are added to the stack 4. In other words, until another sheet (such as the sheet 1*b*) is deposited in the offset manner, the control strip 17 of sheet 30*a* will remain exposed and can therefore be evaluated for print quality. The actual amount of the offset (i.e., the distance between lines 24 and 28) depends on the size and location of the measuring fields 16 comprising the control strip 17, and the dimensions of a photoelectric measuring head 15 that will obtain the measurement data. Accordingly, the first and second gripper release cams 6, 9 and the first and second stops 8, 11 can be adjustable in the sheet-conveying direction so as to provide the required offset distance.

To evaluate the control strip 17, the photoelectric measuring head 15 is arranged to scan the across length of the protruding edge of sheet 30*a*, and provide signals having values corresponding to the print quality. The photoelectric measuring head 15 may be a conventional transversely scanning colorimeter, densitometer, three-range spectrophotometric measuring instrument and/or the like. To facilitate the scanning procedure, a cross-member 14 is disposed slightly above and parallel to the front edge of the sheet 30*a* for supporting the photoelectric measuring head 15 during its transverse movement.

For coordinating the scanning operation a control unit 34 is provided, which is preferably a microprocessor based system. The control unit 34 includes means for receiving a request to select and measure a specimen sheet. The request can be automatically generated, either by external means or internal means within the control unit 34, for example in connection with a specified number of sheets or after a certain period of time elapses. Alternatively, the request can occur by manual operation, for example actuation of a switch 36 by an attendant.

Regardless of the origin of the request, once the request to select and measure a specimen sheet has been received in the control unit 34, the control unit directs the first and second actuating means 7 and 10 to slightly delay the release of the next-arriving sheet as described hereinbefore. Simultaneously, the control unit 34 directs that stop bar 8 be pivoted away while the stop bar 11 is pivoted into the second stop position, i.e., along line 28. Once released, the sheet aligns on stop bar 11, along line 28, that is, in the offset manner extending from the rest of the stack. Ordinarily, the control unit then resets the actuating means and the first and second stop bars 8 and 11 such that subsequent sheets are deposited in the regular manner, i.e., along line 24.

Once the offset sheet is deposited onto the stack 4, the control unit 34 enables transverse drive means 38 for transversely moving the photoelectric measuring head 15 across the entire width of the projecting edge of the sheet 30*a*. While preferably the projecting edge contains the measurement fields 16, it can be readily appreciated that direct sensing of the printed image is also feasible, provided that part of the printed image extends into the overhanging sheet edge. Regardless, as the photoelectric measuring head 15 moves across the fields 16, it provides electronic signals having magnitudes corresponding to the print quality of the scanned fields 16. The control unit 34 receives these signals and corresponds them with individual ones of the fields. The control unit 34 then generally stores the signals as data, and subsequently compares the measured data against ideal data values. Preferably, the control unit 34 next makes adjustments to the printing machine in accordance with the difference between the measured values and the ideal values. For example, the control unit 34 may adjust an ink-regulating unit for the printing machine in accordance with the data received in an effort to achieve the ideal values on subsequently printed sheets.

An important aspect of the invention is that the photoelectric measuring head 15 remains the same vertical distance from the measuring fields 16 of the control strip 17 during the entire scanning operation. Since the stack 4 is ordinarily lowered during the stacking, compensation for the downward movement must be provided. To this end, in a first embodiment the cross-member 14 supporting the photoelectric measuring head 15 is in turn supported by a pair of vertically displaceable supports 12 and 13. Appropriate drive means can lower and raise the supports accordingly. For example, the supports 12, 13 can be mechanically coupled to a servo-motor and lowered and raised by appropriate signals from the control unit 34. In such an embodiment, the control unit 34 also would control the stack positioning drive 26 that lowers the stacking table 5. Thus, by moving both in synchronization, even as the stack 4 is moved, the vertical distance between the photoelectric measuring head 15 and the sheet 30*a* being scanned remains constant during the measurement procedure. At the end of the scanning procedure, the control unit 34 via the servo-motor would then return the photoelectric measuring head 15 to a known vertical starting position.

Alternatively, any lowering of the stacking table 5 can be temporarily suspended by the control unit 34 during the measuring procedure, thus maintaining a constant vertical distance. At the end of the measuring procedure, the lowering of the stack table 5 is then resumed, with an additional amount of lowering provided to compensate for the amount of lowering delayed during scanning. To accomplish the alternative procedure, the control unit 34 directs the lowering of the stack table 5. By employing a lowering system having a top-sheet sensor (not shown) electrically connected to the control unit 34, a simple delayed lowering system is achieved. The control unit 34 simply ignores the sensor's request for lowering during a scanning procedure, and resumes the lowering once the scanning is completed until the sensor no longer detects a sheet above the desired level. Accordingly, the scanning procedure would have to be completed in enough time to resume lowering before the stack height exceeded an allowable level, for example above the first stop 8.

Additionally, because the projecting edges of offset sheets tend to bend with gravity, a sheet support 32 can be optionally attached to the photoelectric measuring head 15. This ensures that offset sheet edges will remain a fixed distance from the photoelectric measuring head 15 during the scanning operation, regardless of the amount that the sheet sags. Thus, no compensation due to sagging differences is necessary for sheets of different thickness, stiffness, grade and the like.

In one embodiment, the sheet support 32 is formed as a rail extending over the length of the sheet. Accordingly, with a simple modification the rail can be made pivotable, and thereby additionally utilized as the stop bar 11 during the offset depositing procedure.

If desired, the photoelectric measuring head, cross-member, sheet support, and the stops can be constructed so as to be a single unit. The unit can then be made detachable or pivotable about a horizontal or vertical axis. Such a design allows convenient access to the remainder of the stacking device.

As can be seen from the foregoing detailed description, an improved method and apparatus for measuring the print quality of printed sheets is provided. Because the measurement takes place directly in the stack of sheets, no control table is necessary. Moreover, because measured sheets are stacked in an offset manner, the edge of the selected sheet can be evaluated by a single scanning measuring head without slowing the rate of stacking subsequent sheets. Finally, it can be seen that such an apparatus can be incorporated into existing stacking mechanisms of printing machines without requiring significant modifications or alterations

What is claimed is:

1. A method of measuring print quality on printed sheets, comprising the steps of:

providing a measuring means for measuring the print quality on the sheets;

printing a predetermined image at an edge of the sheets;

stacking the printed sheets along a first alignment position;

selecting a specimen sheet for measuring the predetermined image thereon;

stacking the specimen sheet at a second alignment position such that the edge of the specimen sheet including the predetermined image extends beyond the first alignment position; and measuring the predetermined image with the measuring means provided and providing at least one value corresponding thereto.

2. The method of claim 1 further comprising the step of evaluating the values provided by the measuring means and providing output signals corresponding thereto.

3. The method of claim 1 wherein said printing of said predetermined printed image on a forward ledge of the sheets includes printing a plurality of measuring fields defining a printed control strip.

4. The method of claim 1 further comprising the step of maintaining a predetermined vertical distance between the measuring means and the edge of the specimen sheet containing the predetermined image during the measuring step.

5. The method of claim 4 further comprising the step of lowering the stack of sheets including the specimen sheet concurrent with the step of stacking the sheets, wherein the vertical distance is maintained by lowering the measuring means in accordance with the lowering of the stack of sheets.

6. The method of claim 4 further comprising the step of lowering the stack of sheets including the specimen sheet, wherein the step of lowering the stack is discontinued during the measuring step to maintain the vertical distance between the measuring means and the edge of the specimen sheet containing the predetermined image.

7. An apparatus for facilitating the measurement of the print quality on printed sheets, at least some of which include a predetermined image printed on an edge of the sheet, comprising, in combination:

means for stacking at least some of the sheets at a first alignment position;

means for selecting a specimen sheet from at least one of the sheets having the predetermined image;

means for stacking the specimen sheet at a second alignment position such that the edge of the specimen sheet including the predetermined image extends beyond the first alignment position;

means for measuring the predetermined image and providing measurement data corresponding thereto; and means for evaluating the measurement data provided by the measuring means.

8. The apparatus of claim 7 wherein the predetermined printed image is printed on a forward edge of the sheets and comprises a plurality of measuring fields defining a printed control strip.

9. The apparatus of claim 1 wherein the means for measuring the predetermined image and providing measurement data corresponding thereto includes a photoelectric measuring head for providing measurement data comprising electrical signals corresponding to the quality of the printed image.

10. The apparatus of claim 9 wherein the means of evaluating the measurement data provided by the measuring means includes a microprocessor for comparing the measurement data received against predetermined data values and outputting electrical signals corresponding thereto.

11. The apparatus of claim 9 wherein the means for measuring the predetermined image includes a driving means for transversely driving the photoelectric measuring head across the predetermined image.

12. The apparatus of claim 11 further comprising a sheet support coupled to the measuring means for supporting the edge of the sheet during the measurement of the image thereon.

13. The apparatus of claim 9 further comprising means for maintaining the vertical distance between the forward edge of the specimen sheet and the measuring means during the measuring of the predetermined image.

14. The apparatus of claim 13 wherein the aligned sheets and the means for measuring the predetermined image are vertically displaceable such that the vertical distance between the specimen sheet and the measuring means is maintained.

15. The apparatus of claim 7 wherein the means for stacking the sheets at a first alignment position comprises a chain-driven sheet gripper for conveying the sheet, a first gripper release cam and a first stop, such that the first gripper release cam releases the gripper at a predetermined position causing the sheet to fall into alignment along the first stop.

16. The apparatus of claim 15 wherein the means for stacking the sheets at a second alignment position comprises means for disabling the first gripper release cam, means for displacing the first stop, a second gripper release cam and a second stop, such that the first gripper release cam is disabled so that the second gripper release cam releases the gripper at a predetermined second position, while the first stop is displaced so as to not contact the sheet thereby causing the sheet to fall into alignment along the second stop.

17. The apparatus of claim 7 wherein the means for selecting a specimen sheet comprises a manually actuable switch, wherein the specimen sheet is selected upon actuation of the switch.

18. The apparatus of claim 7 wherein the means for selecting a specimen sheet select the specimen sheets in response to a predetermined number of sheets being stacked at the first alignment position.

19. The apparatus of claim 7 wherein the means for selecting a specimen sheet select the specimen sheets in response to predetermined time intervals.

* * * * *